United States Patent [19]
Bingham et al.

[11] Patent Number: 6,125,637
[45] Date of Patent: Oct. 3, 2000

[54] SYSTEMS FOR DELIVERING LIQUIFIED NATURAL GAS TO AN ENGINE

[75] Inventors: Dennis N. Bingham; Bruce M. Wilding; James E. O'Brien; Ali S. Siahpush; Kevin B. Brown, all of Idaho Falls, Id.

[73] Assignee: Bechtel BWXT Idaho, LLC, Idaho Falls, Id.

[21] Appl. No.: 09/212,489

[22] Filed: Dec. 16, 1998

Related U.S. Application Data

[60] Provisional application No. 60/069,697, Dec. 16, 1997.

[51] Int. Cl.[7] ........................................ F25B 19/00
[52] U.S. Cl. ............................ 62/7; 62/48.2; 62/50.2; 62/50.4
[58] Field of Search ..................... 62/7, 50.2, 50.4, 62/48.2

[56] References Cited

U.S. PATENT DOCUMENTS

| | | | |
|---|---|---|---|
| 2,481,713 | 4/1949 | Bertea | 251/144 |
| 2,645,906 | 7/1953 | Ryan . | |
| 2,747,374 | 5/1956 | Thompson | 62/50.4 |
| 2,916,061 | 12/1959 | Hahn et al. | 141/349 |
| 2,958,204 | 11/1960 | Spaulding . | |
| 2,964,919 | 12/1960 | Howlett . | |
| 2,996,892 | 8/1961 | Clark | 62/50.4 |
| 3,001,375 | 9/1961 | Tauscher | 62/50.4 |
| 3,018,635 | 1/1962 | Keckler . | |
| 3,070,968 | 1/1963 | Gardner | 62/50.4 |
| 3,151,640 | 10/1964 | Teston . | |
| 3,183,678 | 5/1965 | Hosford | 62/50.4 |
| 3,633,372 | 1/1972 | Kimmel et al. . | |
| 3,658,179 | 4/1972 | Baumann et al. | 210/66 |
| 3,803,858 | 4/1974 | Simon . | |
| 3,898,853 | 8/1975 | Lung . | |
| 4,136,721 | 1/1979 | Holmqvist et al. | 141/11 |
| 4,487,025 | 12/1984 | Hamid . | |
| 4,561,258 | 12/1985 | Brodbeck et al. . | |
| 4,598,554 | 7/1986 | Bastian . | |
| 4,744,222 | 5/1988 | Murai . | |
| 4,987,932 | 1/1991 | Pierson | 141/1 |
| 5,121,609 | 6/1992 | Cieslukowski | 62/50.4 |
| 5,127,230 | 7/1992 | Neeser et al. | 62/7 |
| 5,163,409 | 11/1992 | Gustafson et al. | 123/525 |
| 5,325,894 | 7/1994 | Kooy et al. | 141/4 |
| 5,373,700 | 12/1994 | McIntosh | 62/48.1 |
| 5,421,162 | 6/1995 | Gustafson et al. | 62/7 |
| 5,566,712 | 10/1996 | White et al. | 137/587 |
| 5,590,535 | 1/1997 | Rhoades | 62/50.2 |

OTHER PUBLICATIONS

Hibl, J. J., "Cyrogenic Fuel Systems for Motor Vehicles," *Advances in Cryogenic Engineering*, vol. 21, pp. 180–186.

*Primary Examiner*—Ronald Capossela
*Attorney, Agent, or Firm*—Workman Nydegger & Seeley

[57] ABSTRACT

A fuel delivery system includes a fuel tank configured to receive liquid natural gas. A first conduit extends from a vapor holding portion of the fuel tank to an economizer valve. A second conduit extends from a liquid holding portion of the fuel tank to the economizer valve. Fluid coupled to the economizer valve is a vaporizer which is heated by coolant from the engine and is positioned below the fuel tank. The economizer valve selectively withdraws either liquid natural gas or vaporized natural gas from the fuel tank depending on the pressure within the vapor holding portion of the fuel tank. A delivery conduit extends from the vaporizer to the engine. A return conduit having a check valve formed therein extends from the delivery conduit to the vapor holding portion of the fuel tank for pressurizing the fuel tank.

19 Claims, 12 Drawing Sheets

SYSTEMS FOR DELIVERING LIQUIFIED NATURAL GAS TO AN ENGINE

RELATED APPLICATION

This application claims priority from provisional application Ser. No. 60/069,697 filed Dec. 16, 1997.

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

BACKGROUND OF THE INVENTION

1. Field of the Invention

The present invention relates to fuel delivery systems and, more specifically, systems for delivering liquified natural gas from a fuel tank to an engine.

2. Present State of the Art

The increasing output of automobile emissions and the decreasing supply of oil reserves has motivated the search for alternative motor vehicle fuels. One alternative fuel is natural gas. Natural gas is clean burning and can be stored in a dense, high energy liquid form. Liquefying natural gas is accomplished by cooling the natural gas to a cryogenic temperature, typically below −260° F., which condenses the gas into a liquid. Working with and keeping natural gas at a cryogenic temperature, however, creates inherent problems. Furthermore, natural gas, prior to combustion, is a harmful greenhouse gas. As such, it is important that the escape of any natural gas be minimized to prevent increased damage to the atmosphere.

In one approach to using natural gas in automobiles, the natural gas is initially stored in large tanks at refueling stations. The large tanks maintain the fuel at a cryogenic temperature so as to keep the natural gas in a dense liquid state. Smaller insulated fuel tanks are located within the automobiles and can be filled with the liquified natural gas at a refueling station. As discussed above, it is desirable to store the naturel gas in a liquified state. It is also beneficial, however, to have the automobile fuel tank sufficiently pressurized so that the fuel therein will automatically flow to the vehicle engine. Although a pump can be used to deliver the fuel to the engine, use of a pump requires energy. Furthermore, pumping natural gas at cryogenic temperatures has been found problematic.

In one approach to obtaining the desired pressure within the automobile fuel tank, systems have been incorporated into refueling stations which warm the liquified natural gas as it is pumped into the automobile fuel tank. By heating the liquified natural gas to a desired temperature, a portion of the liquified natural gas vaporizes within the fuel tank to produce the desired pressure. The pressure created within the fuel tank as a result of warming the fuel is call "saturation pressure". Although this process achieves the desired objective, it also produces several problems.

For example, the systems for heating the natural gas at the refueling station are time consuming and expensive to operate and build. Furthermore, as a result of warming the natural gas, less natural gas can be stored within the fuel tank. In addition, since all of the natural gas that is pumped into the automobile fuel tank is heated, the fuel must be used relatively quickly to prevent having to vent any of the natural gas to the atmosphere. That is, although the automobile fuel tank is insulated, once the liquified natural gas is pumped therein, the fuel begins to slowly warm towards an equilibrium with the outside temperature. As the fuel warms, the pressure within the tank increases. Once the tank reaches a control pressure, a pressure relief valve is opened allowing a portion of the natural gas to escape into the atmosphere, thereby decreasing the internal pressure. The time period that a tank can hold natural gas without having to vent is called the "hold time." As previously discussed, releasing natural gas into the atmosphere is both wasteful and potentially harmful.

In contrast, if the natural gas is consumed too quickly, the pressure within the fuel tank can drop below the required operating pressure. As liquified natural gas is consumed, the volume of the vapor holding portion of the fuel tank is increased. As this volume increases, a portion of the liquified natural gas is vaporized to fill the space within the fuel tank. Vaporization of natural gas is an endothermic process which absorbs heat. Accordingly, as the natural gas within the fuel tank is vaporized, the temperature and thus pressure within the fuel tank decreases. If liquified natural gas is consumed too quickly, the pressure will drop below the operating pressure.

In an alternative approach to pressurizing the automobile fuel tank, a heater is directly coupled with the automobile fuel tank for heating the liquified natural gas therein. The problem with this approach is that it takes both time and energy to heat the fuel within the fuel tank. Furthermore, the same problem exists of having to use the natural gas relatively quickly to prevent having to vent portions of the natural gas to the atmosphere.

Other problems in conventional liquified natural gas systems relate to the lines extending from the fuel tank to the engine. Many of the prior art systems require the use of electronic switches, solenoids, and computers to operate them. The use of such electronics is expensive, increases the complexity of the system, decreases the reliability of the system, and consumes large amounts of energy.

The same problems as discussed above for vehicles are also applicable to using natural gas to run engines that are not vehicle related.

OBJECTS AND BRIEF SUMMARY OF THE INVENTION

Accordingly, it is an object of the present invention to provide improved fuel delivery systems for liquified natural gas.

Another object of the present invention is to provide improved systems as above which do not require the liquified natural gas to be warmed as it is transferred from a refueling facility to a fuel tank for operating an engine.

Yet another object of the present invention is to provide systems as above which do not require all of the liquid natural gas disposed within the fuel tank to be warmed therein.

Still another object of the present invention is to provide systems as above which significantly increase the hold time of the liquified natural gas in the fuel tank.

Another object of the present invention is to provide improved systems as above which maintain a desired pressure within the fuel tank substantially independent of the fuel consumption rate.

Yet another object of the present invention is to provide systems as above which enable relatively quick pressurization of the fuel tank holding the liquid natural gas.

Finally, another object of the present invention to provide improved systems as above which provide fuel lines extending from the fuel tank to the engine which do not require the use of electronic switches, solenoids or computers to function.

To achieve the foregoing objects, and in accordance with the invention as embodied and broadly described herein, a fuel delivery system is provided for operation with an engine. The engine can be mounted to a vehicle or be stationary, for example, the engine can be used in a generator or air conditioning system. The fluid delivery system includes an insulated fuel tank configured to receive liquid natural gas at cryogenic temperatures, preferably below −220° F. The fuel tank bounds a chamber which includes a liquid holding portion for holding liquified natural gas and a vapor holding portion for holding vaporized natural gas. A vapor conduit extends from the vapor holding portion of the fuel tank to an economizer valve. A liquid conduit extends from the liquid holding portion of the fuel tank to the economizer valve. A transition conduit extends from the economizer valve to a vaporizer.

The economizer valve is configured to operate in one of two positions depending on the pressure within the vapor holding portion of the fuel tank. When pressure within the vapor holding portion of the fuel tank is below a select pressure, the economizer valve facilitates the flow of the liquid natural gas from the fuel tank to the vaporizer. When the pressure within the vapor holding portion of the fuel tank exceeds the select pressure, the economizer valve blocks the flow of liquid natural gas and facilitates the flow of the vaporized natural gas from the fuel tank to the vaporizer. Once sufficient vaporized natural gas has been removed from the fuel tank to drop the pressure therein below the select pressure, the economizer valve again facilitates the flow of the liquid natural gas from the fuel tank to the vaporizer.

The vaporizer is heated with coolant from the engine. As liquified natural gas is passed through the vaporizer, the elevated temperature causes the liquified natural gas to flash into a vapor. A delivery conduit extends from the vaporizer to the engine for delivering the vaporized fuel thereto. A return conduit having a check valve coupled therewith extends from the delivery conduit to the vapor holding portion of the fuel tank. Feeding of the vaporized natural gas from the return conduit to the vapor holding portion of the fuel tank functions to pressure the fuel tank.

It is desirable to keep the liquid natural gas within the fuel tank at the lowest economical temperature. This is typically in a range between about −220° F. to about −240° F. At these temperatures, however, there is insufficient saturation pressure within the vapor holding portion of the fuel tank to drive the liquid natural gas from the fuel tank to the engine. Until such time that the liquid natural gas warms up from the outside environment to a point that it produces the required saturation pressure, the vaporized natural gas feeding from the return conduit to the vapor holding portion of the fuel tank functions to create the required pressure to operate the system.

To enable effective pressurization of the fuel tank using the return conduit, the vaporizer must be positioned a required distance below the surface of the liquified natural gas in the fuel tank. Specifically, the head between the surface level of the liquified natural gas and the point in the vaporizer where the liquified natural gas is vaporized must be sufficiently large to create a required pressure on the vaporized natural gas leaving the vaporizer. This required pressure must be greater than the summation of the pressure losses on the natural gas as it passes from the fuel tank through the economizer valve, vaporizer, and back to the fuel tank. As a practical matter, to enable operation of the engine at low levels of fuel within the fuel tank, the vaporizer needs to be positioned below the elevation of the fuel tank.

The above system has several advantages over prior art systems. For example, in the present inventive system the liquid natural gas within the fuel tank can be maintained at its lowest possible temperature. As a result, it is not necessary to incorporate systems for warming the fuel as it is transferred from a refueling facility or for warming the fuel within the fuel tank. Furthermore, since the fuel is maintained at its low cryogenic temperature, the hold time for the fuel tank is much longer than conventional systems. In addition, the present system can continually regulate the pressure within the fuel tank independent of the consumption rate. Finally, the system can be operated in a passive configuration which does not require the use of electronic solenoids, switches, or computers to run.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
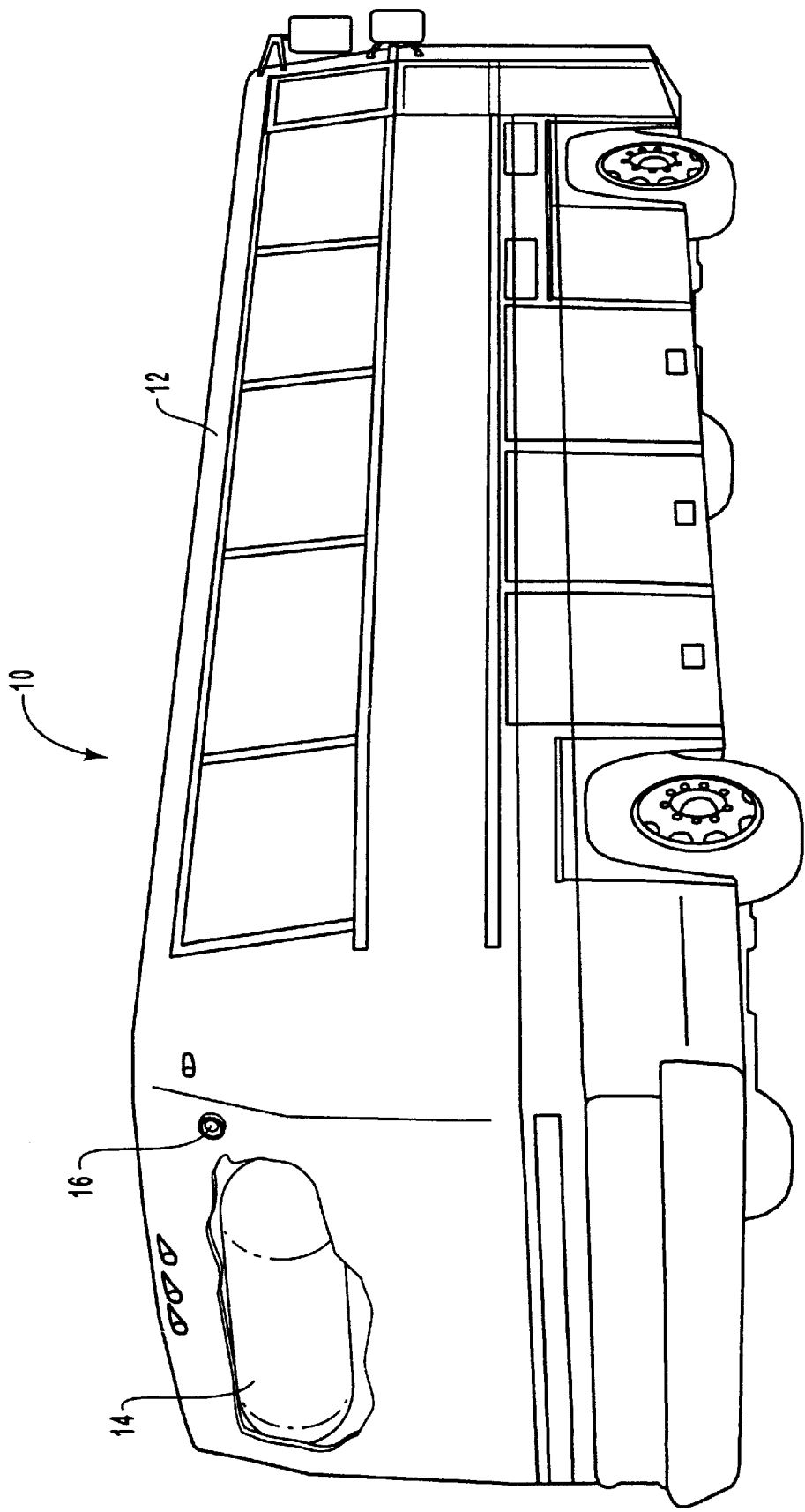
FIG. 1 is a perspective view of a vehicle incorporating an inventive fuel delivery system.

Depicted in FIG. 1 is one embodiment of a vehicle 10 incorporating features of the present invention. As used in the specification and appended claims, the term "vehicle" is defined to mean any motorized vehicle. By way of example and not by limitation, the term "vehicle" includes cars, pickup trucks, cargo trucks, buses, trains, aircraft, tractors, construction vehicles, off-road equipment, farming vehicles, and helicopters. Vehicle 10 is shown having a chassis 12 with a fuel tank 14 mounted thereon. The term "chassis" as used in the specification and appended claims is intended to broadly include the frame and/or body of the vehicle.

In alternative embodiments, the inventive fuel delivery system as disclosed herein can be used in situations other than on vehicles. For example, the inventive fuel delivery systems can be used with engines relating to compressors, generators, heating and air conditioning systems, and virtually any other system where an engine is required.

Fuel tank 14 is insulated, preferably by having a vacuum barrier, and is configured to receive and retain liquid natural gas at cryogenic temperatures. Specifically, it is preferred that fuel tank 14 be able to receive liquid natural gas at temperatures below −220° F. Fuel tank 14 is filled through an inlet 16. The term "natural gas" as used in the specification and appended claims is bodily intended to include all hydrocarbon gases that exist in a gaseous state at ambient conditions. By way of example and not by limitation, natural gas includes methane, ethane, propane, butane, and pentane.

Figure 2:
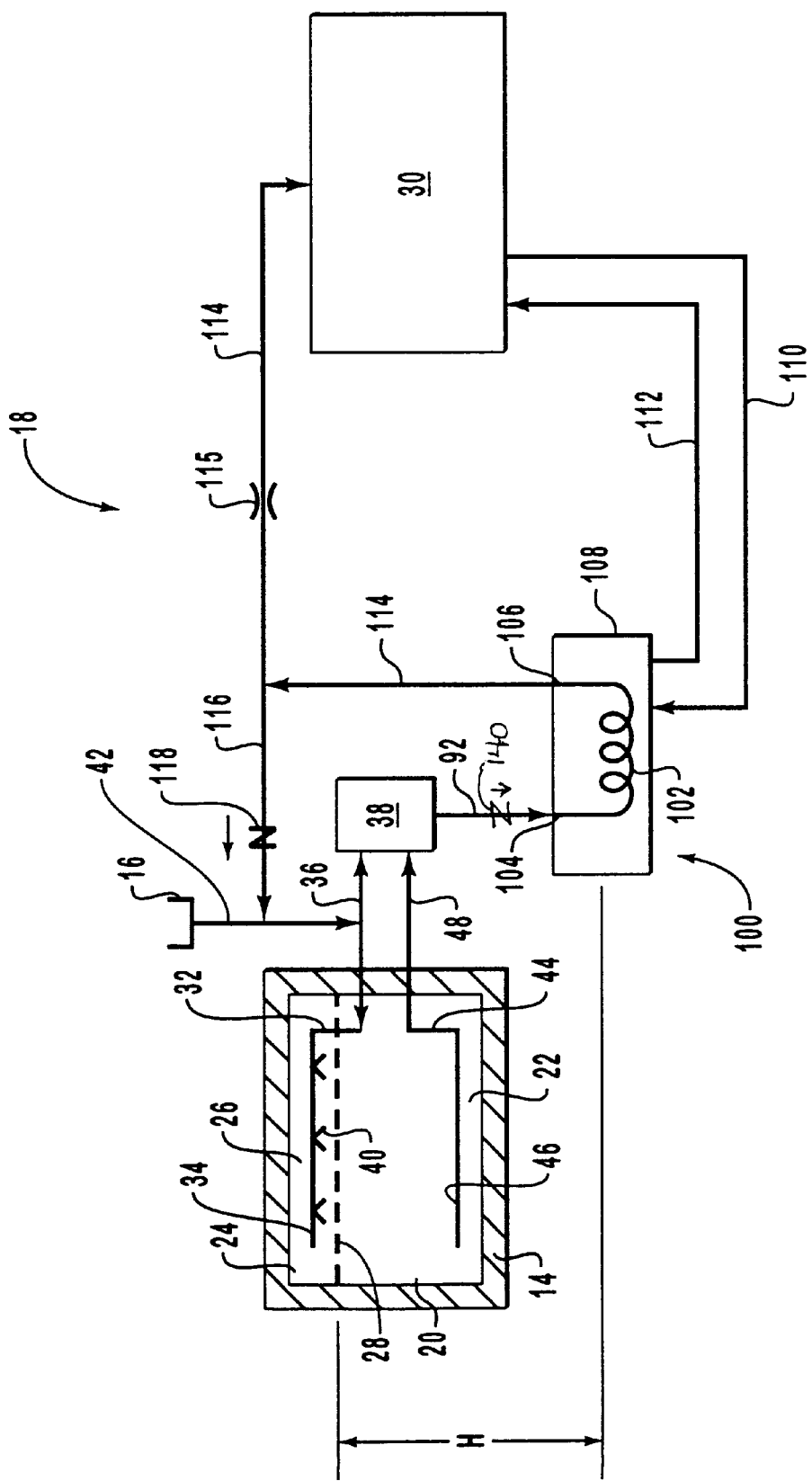
FIG. 2 is a schematic representation of the fuel delivery system incorporated into the vehicle in FIG. 1.

Depicted in FIG. 2 is a schematic representation of one embodiment of a fuel delivery system 18 that can be incorporated into vehicle 10. As depicted in FIG. 2, fuel tank 14 comprises a liquid holding portion 20 for holding liquified natural gas 22 and a vapor holding portion 24 for holding vaporized natural gas 26. Liquid holding portion 20 and vapor holding portion 24 are separated by the surface of liquified natural gas 22 defined by dotted line 28. The volume of liquid holding portion 20 and vapor holding portion 24 vary inversely depending on the volume of liquified natural gas 22 within tank 14. That is, as liquified natural gas 22 is consumed, surface 28 of liquified natural gas 22 lowers, thereby decreasing the volume of liquid holding portion 20 and increasing the volume of vapor holding portion 24.

Tank 14 is filled with liquified natural gas 22 by passing liquified natural gas 22 through inlet 16 and into a filling conduit 42. Filling conduit 42 is fluid coupled with a vapor conduit 32 having a first end 34 disposed within vapor holding portion 24 and an opposed second end 36 fluid coupled to an economizer valve 38. Mounted at first end 34 of vapor conduit 32 are a plurality of spray nozzles 40. As a result of relative pressures, liquified natural gas 22 entering vapor conduit 32 from filling conduit 42 travels to first end 34 where it is sprayed into tank 14 through nozzles 40.

Nozzles 40 serve a unique purpose. Under normal operating conditions, once vehicle 10 has run for a sufficient period of time to substantially empty fuel tank 14 of liquified natural gas 22, the remaining vaporized natural gas 26 within fuel tank 14 is at a relatively high saturation pressure. This is because the remaining natural gas within fuel tank 14 has been warmed by the outside environment during operation. During refueling, as the cold liquified natural gas is sprayed into fuel tank 14 over the vaporized natural gas therein, the vaporized natural gas is cooled and condensed, thereby reducing the saturation pressure. As a result, fuel tank 14 can be filed quickly and to a much greater extent without having to vent vaporized natural gas into the atmosphere. There are of course a variety of single or multiple spray nozzles that can be used. Furthermore, various dripping or other mechanisms can be used to help disperse the liquified natural gas over the vaporized natural gas within fuel tank 14.

In one embodiment of the present invention, means are provided for delivering natural gas from fuel tank 14 to an engine 30. Engine 30 is likewise mounted to chassis 12 of vehicle 10. In more specific embodiments, means are provided for passively delivering the natural gas from fuel tank 14 to engine 30 while automatically and passively maintaining a pressure within a predetermined range within vapor holding portion 24 of fuel tank 14. As used in the specification and appended claims, the term "passively" defines a system that is self-regulating without the use of electronically actuated flow controlling devices such as solenoids or other valves or switches.

By way of example of the above means and not by limitation, vapor conduit 32 extends from vapor holding portion 24 of fuel tank 14 to economizer valve 38, as discussed above. Similarly, a liquid conduit 44 has a first end 46 positioned within liquid holding portion 20 of fuel tank 14 and an opposing second end 48 fluid coupled to economizer valve 38. An opening at first end 46 of liquid conduit 44 enables liquid natural gas 22 to travel through liquid conduit 44 to economizer valve 38.

Figure 3:
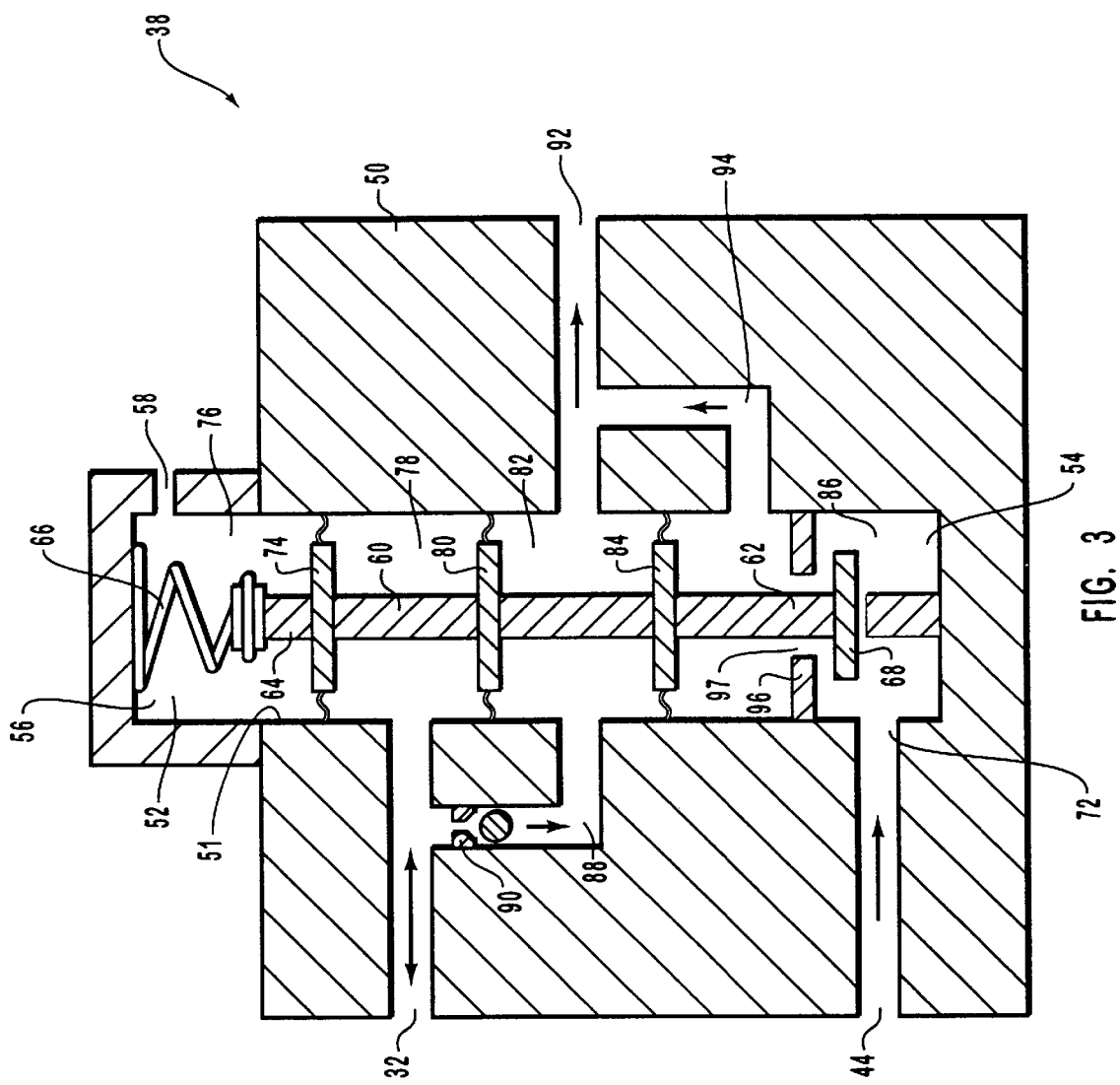
FIG. 3 is a cross-sectional front view of an economizer valve used in the fuel delivery system shown in FIG. 2.

The present invention also includes control means for automatically withdrawing a select natural gas chosen from either liquified natural gas 22 or vaporized natural gas 26 from fuel tank 14 based on the pressure within fuel tank 14. By way of example and not by limitation, depicted in FIG. 3 is one embodiment of economizer valve 38. Economizer valve 38 includes a housing 50 having an interior surface 51 bounding an elongated chamber 52. Chamber 52 extends from a bottom end 54 to a top end 56. Longitudinally disposed within chamber 52 is a rod 60. Rod 60 also has a bottom end 62 and an opposing top end 64. Extending between top end 64 of rod 60 and housing 50 is a resiliently compressible spring 66. Radially projecting out at bottom end 62 of rod 60 is an annular seal 68. Radially inwardly projecting from interior surface 51 around bottom end 62 of rod 60 is a circular flange 96 having an opening 97 extending therethrough. Flange 96 is configured such that when seal 68 is biased thereagainst, opening 97 is sealed closed.

Extending across chamber 52 and sealed against rod 60 and interior surface 51 are three distinct flexible diaphragms which divide chamber 52 into four isolated compartments. Specifically, a flexible first diaphragm 74 bounds a first compartment 76 extending between first diaphragm 74 and top end 56 of compartment 52. First compartment 76 houses spring 66 and communicates to the exterior through an opening 58. An isolated second compartment 78 is positioned between first diaphragm 74 and a flexible second diaphragm 80. A third compartment 82 is formed between second diaphragm 80 and a flexible third diaphragm 84. Finally, a fourth compartment 86 is bounded between third diaphragm 84 and bottom end 54 of chamber 52.

Vapor conduit 32 extends through housing 50 and communicates with second compartment 78. A bypass conduit 88 extends from vapor conduit 32 to third compartment 82. A check valve 90 is positioned within bypass conduit 88. A transition conduit 92 extends through housing 50 from third compartment 82 to the exterior of economizer valve 38. Liquid conduit 44 extends through housing 50 and communicate with fourth compartment 86. A bypass conduit 94 extends from fourth compartment 86, at a side of flange 96 opposite liquid conduit 44, to transition conduit 92.

Economizer valve 38 is configured to automatically operate in one of two positions for withdrawing either vaporized natural gas 26 from fuel tank 14 or liquified natural gas 22 from fuel tank 14. The determination of which of the two gas forms is removed from fuel tank 14 depends on the pressure within vapor holding portion 24. That is, economizer valve 38 moves between one of the two positions when a select pressure is reached within vapor holding portion 24. The select pressure is manually set and can vary depending on the intended use and system parameters. The select pressure is typically in a range between about 40 psi to about 140 psi, with about 60 psi to about 100 psi being preferred and about 20 psi to about 80 psi being more preferred.

By way of example, when the pressure within vapor holding portion 24 is below the select pressure, liquified natural gas 22 flows through supply conduit 44 into fourth compartment 86, through opening 97 in flange 96, and through bypass conduit 94 where it eventually exits through transition conduit 92. Check valve 90 prevents liquified natural gas 22 from passing into vapor conduit 32. As the pressure increases within vapor holding portion 24, for reasons as will be discussed later, the pressure correspondingly increases within second compartment 78. This is because second compartment 78 and vapor holding portion 24 are coupled together by vapor conduit 32.

Since first compartment 76 is under atmospheric conditions as a result of opening 58, as second compartment 78 is pressurized, first diaphragm 74 is pressed into first compartment 76 causing rod 60 to compress against spring 66. The resistance of spring 66 is manually set such that as the pressure within second compartment 78 reaches the select pressure, rod 60 is sufficiently compressed against spring 66 so that seal 68 is biased against flange 96, thereby sealing opening 97 closed. Vaporized natural gas 26 is then permitted to pass from vapor conduit 32 through bypass conduit 88 into third compartment 82 and subsequently out transition conduit 92. Once the pressure within second compartment 78 drops below the select pressure, spring 66 pushes rod 60 downward so as to separate seal 68 and flange 96, thereby again allowing liquified natural gas 22 to pass therethrough. Standard economizer valves, such as that discussed above, can be purchased from MVE out of Bloomington, Minn.

Returning to FIG. 2, the select natural gas leaving economizer valve 38 travels through transition conduit 92 to a vaporizer 100. Vaporizers, also referred to as heat exchangers, can be purchased off the shelf. A conventional vaporizer comprises a coil 102 having an inlet end 104 and an outlet end 106. At least a portion of coil 102 is enclosed within a housing 108. In the present invention, housing 108 is fluid coupled to a pair of heating conduits 110 and 112 which continually cycle heated radiator fluid between housing 108 and engine 30. As liquified natural gas 22 passes through coil 102 within housing 108, the heat from the radiator fluid causes the liquified natural gas to flash to a vapor. One way to check valve 140 reduces elevation sensitivity of vaporizor 100.

The present invention also provides means for delivering at least a portion of the select gas from vaporizer 100 to engine 30. By way of example and not by limitation, a delivery conduit 114 extends from vaporizer 106 to engine 30. To help optimize the process, a flow regulator 115 can be attached to delivery conduit 114. Means are also provided for enabling delivery of a portion of the select gas from vaporizer 100 back to fuel tank 14. By way of example and not by limitation, a return conduit 116 having a check valve 118 formed thereon extends from delivery conduit 114 to filling conduit 42. As a result, depending on the rate of fuel consumption by engine 30, a portion of the vaporized natural gas from delivery conduit 114 can travel through return conduit 116, filling conduit 42, and vapor conduit 32 where is subsequently enters into vapor holding portion 24 of tank 14. The feeding or at least communication of vaporized natural gas from delivery conduit 114 with vapor holding portion 24 provides the needed pressure for driving liquified natural gas 22 through the system to engine 30 without the need of a pump. When the pressure within vapor holding portion 24 exceeds the desired or select pressure, economizer valve 38 pulls off the vaporized natural gas as previously discussed.

There are of course, a variety of alternative conduit configurations that can be used to feed the vaporized natural gas back to vapor holding portion 24. By way of example, the vaporized natural gas can be fed back into the economizer valve, as will be illustrated in a subsequent embodiment. Furthermore, a conduit could be formed that extends directly between delivery conduit 114 and vapor holding portion 24. Furthermore, a conduit can be formed to extend directly between vaporizer 106 and vapor holding portion 24. Other embodiments will be set forth later in the disclosure.

One of the novel concepts of the present invention is the positioning of vaporizer 100 relative to fuel tank 14. To enable the vaporized natural gas leaving vaporizer 100 to flow back into vapor holding portion 24, a certain elevation difference or head H must be achieved between surface 28 of liquified natural gas 22 and the point in vaporizer 100 where the liquified natural gas is vaporized. Specifically, head H must be sufficiently large to produce a pressure on the vaporized natural gas leaving vaporizer 100 that is greater than the summation of all the pressure losses as a result of the natural gas passing from fuel tank 14 through economizer valve 38, vaporizer 100, and the various conduits back to vapor holding portion 24. If head H is insufficient to overcome these pressure losses, the vaporized natural gas will not flow back into vapor holding portion 24 and thus pressure will not build therein. Since surface 28 of liquified natural gas 22 continually drops as the natural gas is consumed in engine 30, to maintain operation at low fuel levels it is preferred that vaporizer 100 be positioned below fuel tank 14.

The greater the head H, the faster in which vapor holding portion 24 will be pressurized. The rate at which vapor holding portion 24 is pressurize is an important consideration for startup time after refueling. That is, once fuel tank 14 is filled with liquid natural gas, the pressure within vapor holding portion 24 is typically insufficient to deliver liquified natural gas to engine 30. Alternative heating sources such as solar radiation, batteries, or using gasoline to run engine 30 can be used for heating vaporizer 100 and thus pressurizing vapor holding portion 24. However, it is desirable to be able to pressurize vapor holding portion 24 as quickly as possible so as to enable operation using the liquid natural gas.

By increasing the head H, pressure on the vaporized gas is increased, thereby increasing the rate and shortening the time for pressurizing vapor holding portion 24. In one embodiment, vapor holding portion 24 of tank 14 can be pressurized to a select operational pressure in a period of time after refueling less than about 15 minutes, more preferably in less than about 10 minutes, and most preferably in less than about 5 minutes. In some embodiments, it is also desirable that vaporizer 100 be positioned below tank 14 at a distance greater than about 1 inch, more preferably greater than about 6 inches, and most preferably greater than about 1 foot.

Figure 4:
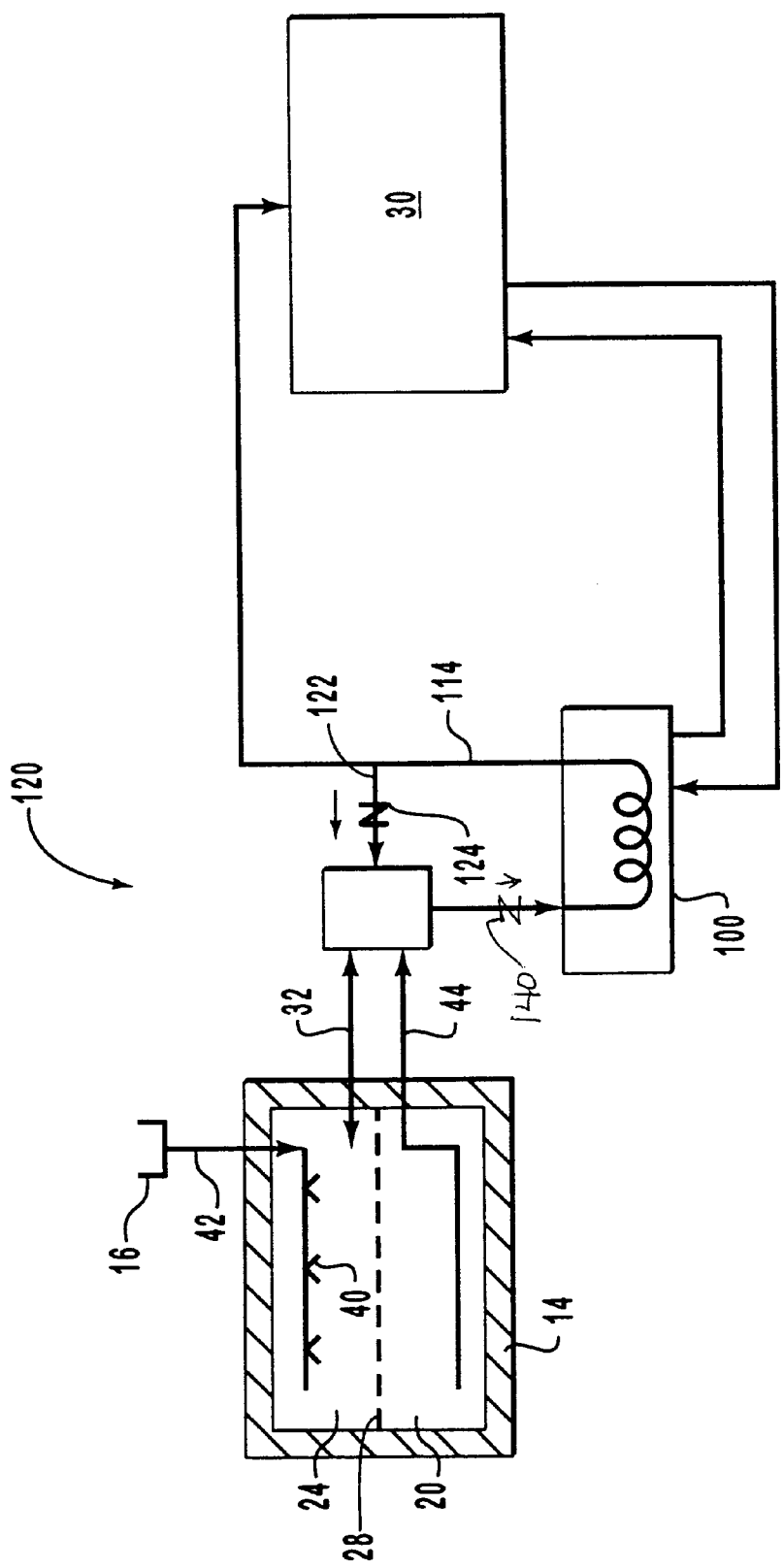
FIG. 4 is a schematic representation of an alternative embodiment of the fuel delivery system shown in FIG. 2.
Figure 5:
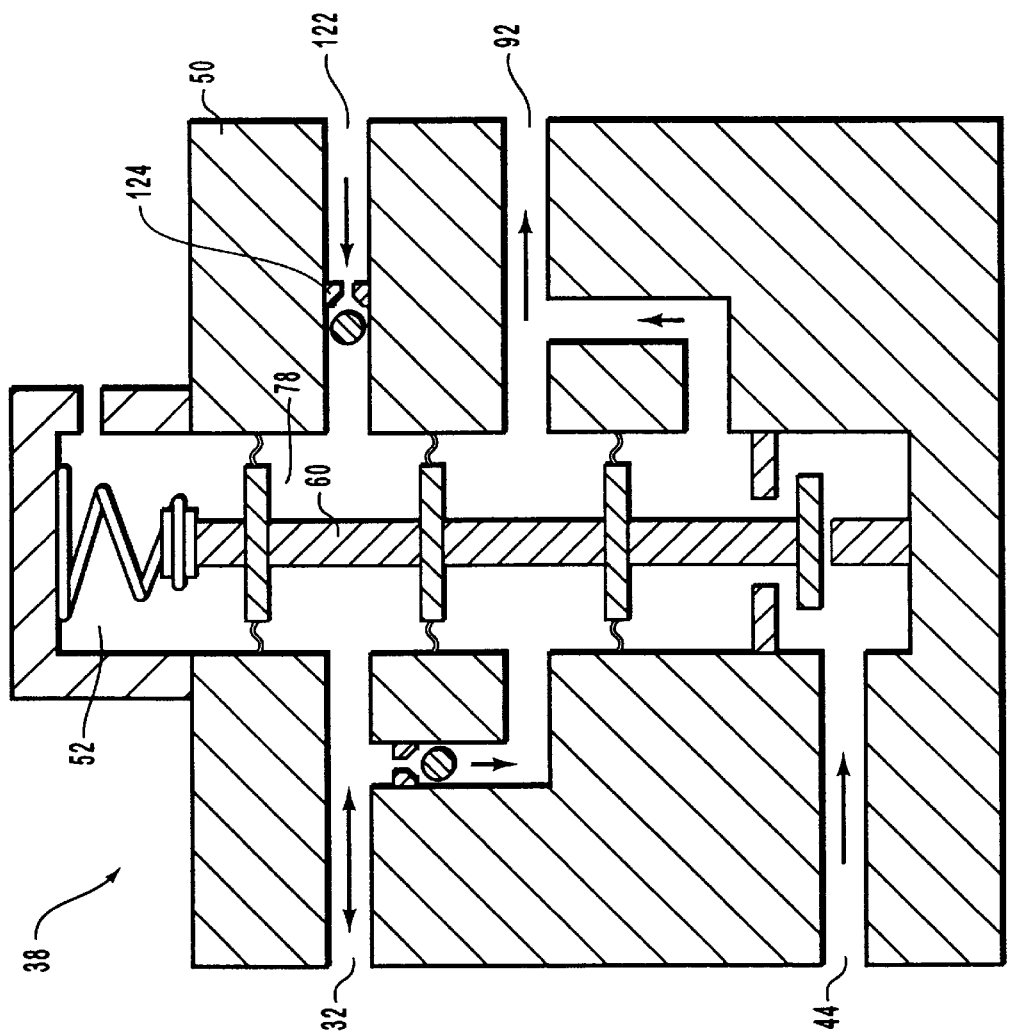
FIG. 5 is a cross-sectional front view of the economizer valve used in the fuel delivery system shown in FIG. 4.

Depicted in FIG. 4 is an alternative embodiment of a fuel delivery system 120. Like structural elements between fuel delivery system 18 and 120 are identified by like reference characters. In contrast to fuel delivery system 18, filling conduit 42 can directly fluid couple with tank 14 through nozzles 40. Furthermore, vapor conduit 32 need not communicate with nozzles 40. Return conduit 116 has been removed and replaced with a conduit 122. Conduit 122 has a check valve 124 formed therewith and extends from delivery conduit 114 to economizer valve 38. Conduit 92 has a one way check valve 140 which reduces elevation sensitivity of vaporizer 100. As depicted in FIG. 5, economizer valve 38 has been altered to have conduit 122 extending through housing 50 to second compartment 78. Check valve 124 prevents vaporized natural gas from passing from second compartment 78 through conduit 122. Check valve 124, however, does enable the vaporized natural gas to pass from delivery conduit 114 into second compartment 78 for pressurization of vapor holding portion 24, thereby producing the same effect as previously discussed with economizer valve 38 in FIG. 3.

Figure 6:
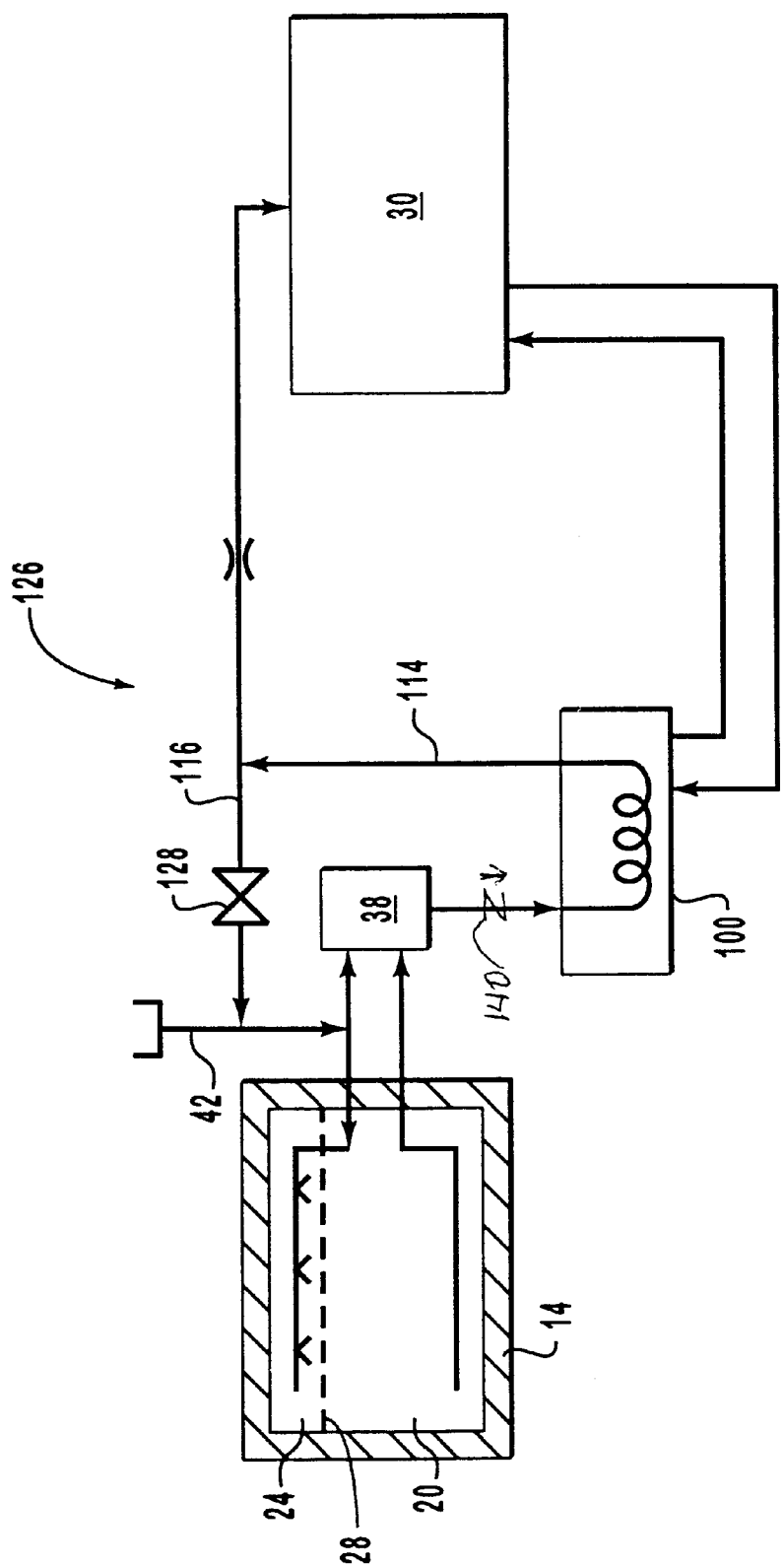
FIGS. 6–12 are schematic representations of alternative embodiments of the fuel delivery system shown in FIG. 2.

FIG. 6 is an alternative embodiment of a fluid delivery system 126 in which one way check valve 118 of fluid delivery system 18 has been replaced by an electronic solenoid 128. Solenoid 128 electronically opens and closes conduit 116. One way check valve 140 reduces elevation sensitivity of vaporizor 100.

Figure 7:
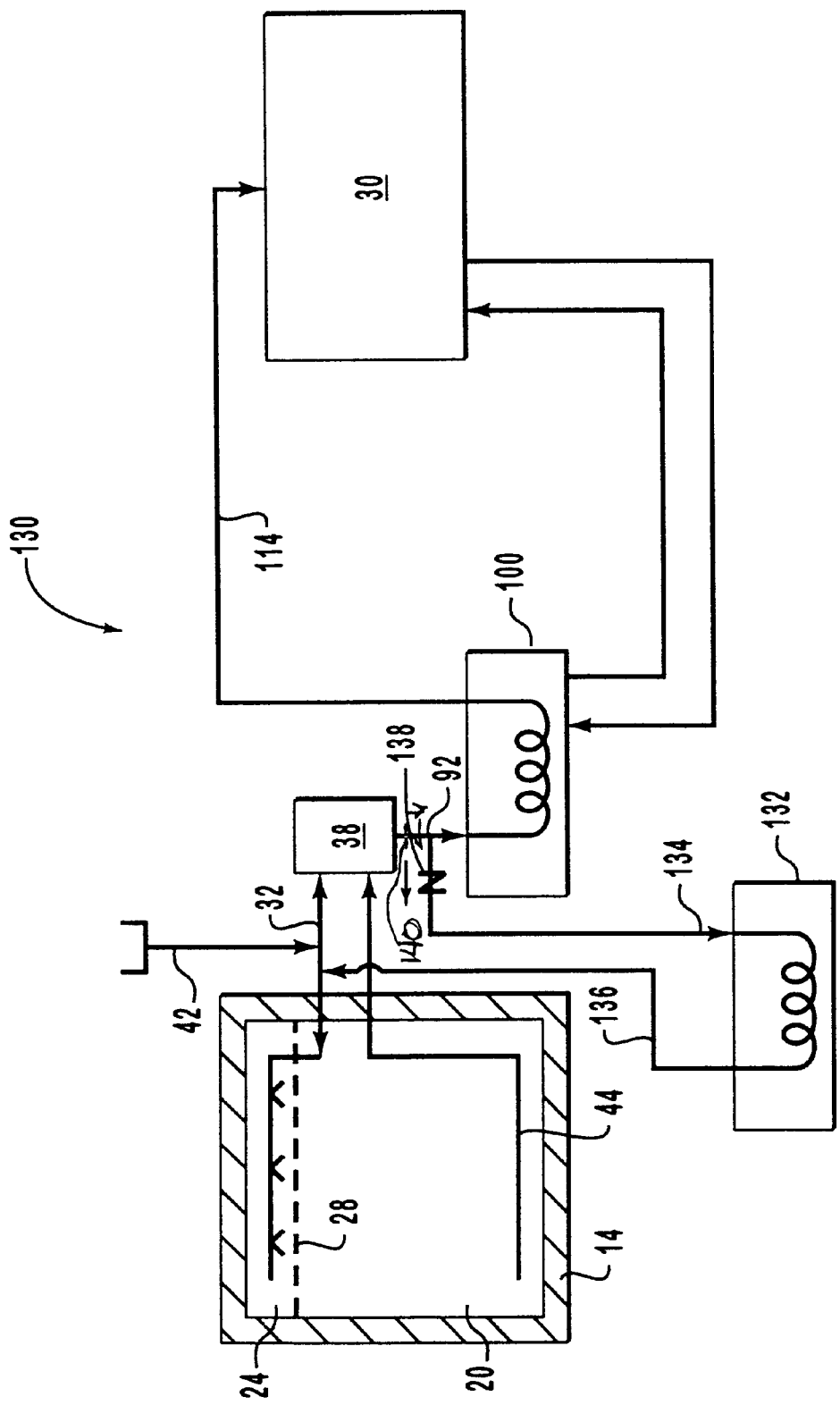

FIG. 7 is an alternative embodiment of a fuel delivery system 130. This embodiment can be used when it is impossible or impractical to position vaporizer 100 at a position sufficiently far below surface 28 of liquified natural gas 22 to obtain the desired head H. In this embodiment, a smaller vaporizer 132 can be positioned at a preferred distance below fuel tank 14. A conduit 134 having a one way check valve 138 fluid couples transition conduit 92 to vaporizer 132. A one way check valve 140 reduces elevation sensitivity of vaporizor 100 and/or vaporizer 132. Conduit 134 thus provides liquified natural gas to vaporizer 132. A conduit 136 delivers the natural gas vaporized by vaporizer 132 to vapor conduit 32, thereby pressurizing vapor holding portion 24 in substantially the same way as previously discussed with regard to FIG. 2. Vaporizer 132 can be heated using a variety of alternative designs, for example, coolant can be taken from engine 30. Alternatively, solar or battery operated heating devices can be used.

Figure 8:
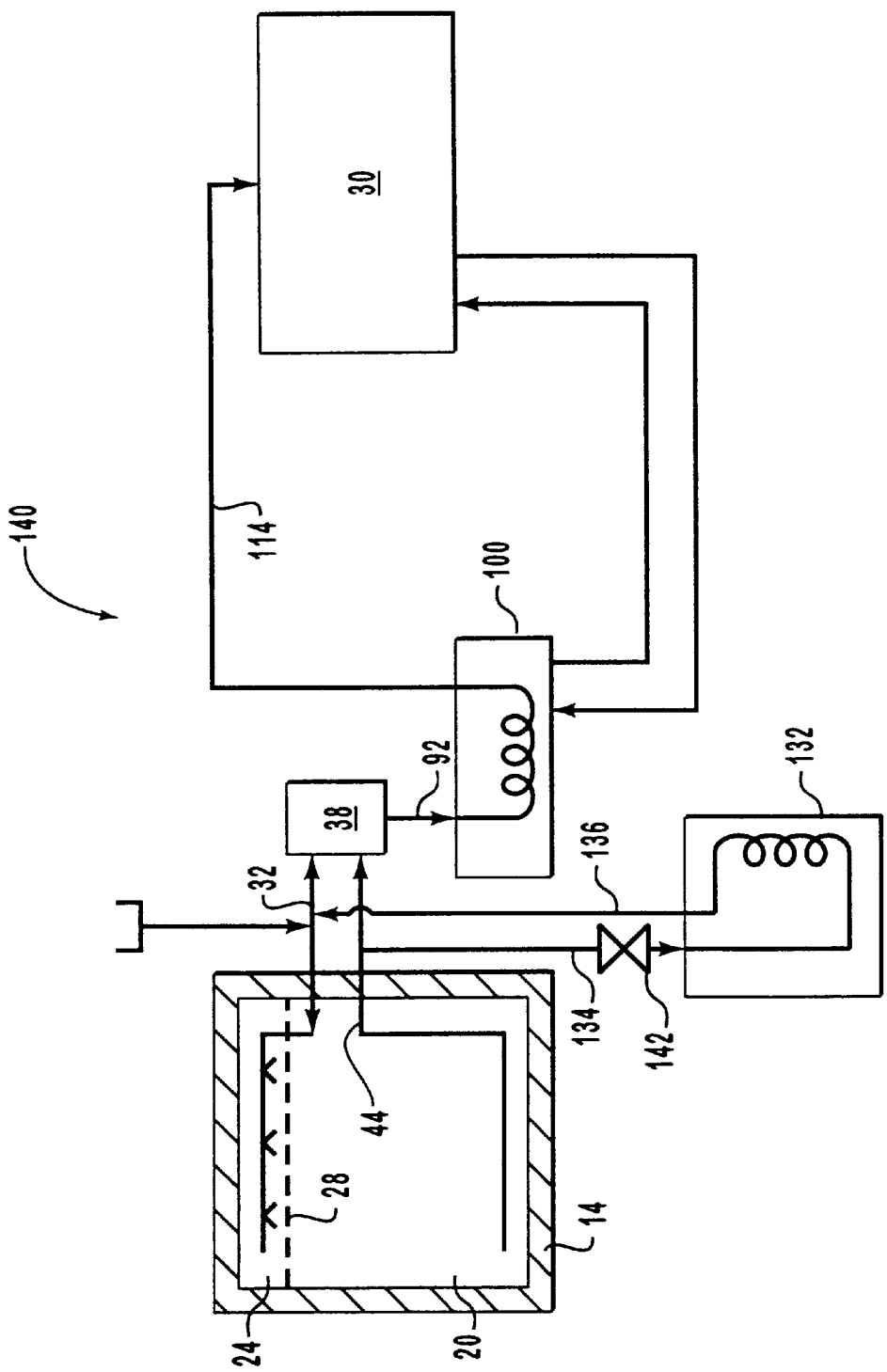

Depicted in FIG. 8 is a fluid delivery system 140 similar to fluid delivery system 130 depicted in FIG. 7. In contrast, however, conduit 134 of fluid delivery system 140 is fluid coupled to supply conduit 44 rather than transition conduit 92. Furthermore, one way check valve 138 has been replaced by an electronically operated solenoid valve 142.

Figure 9:
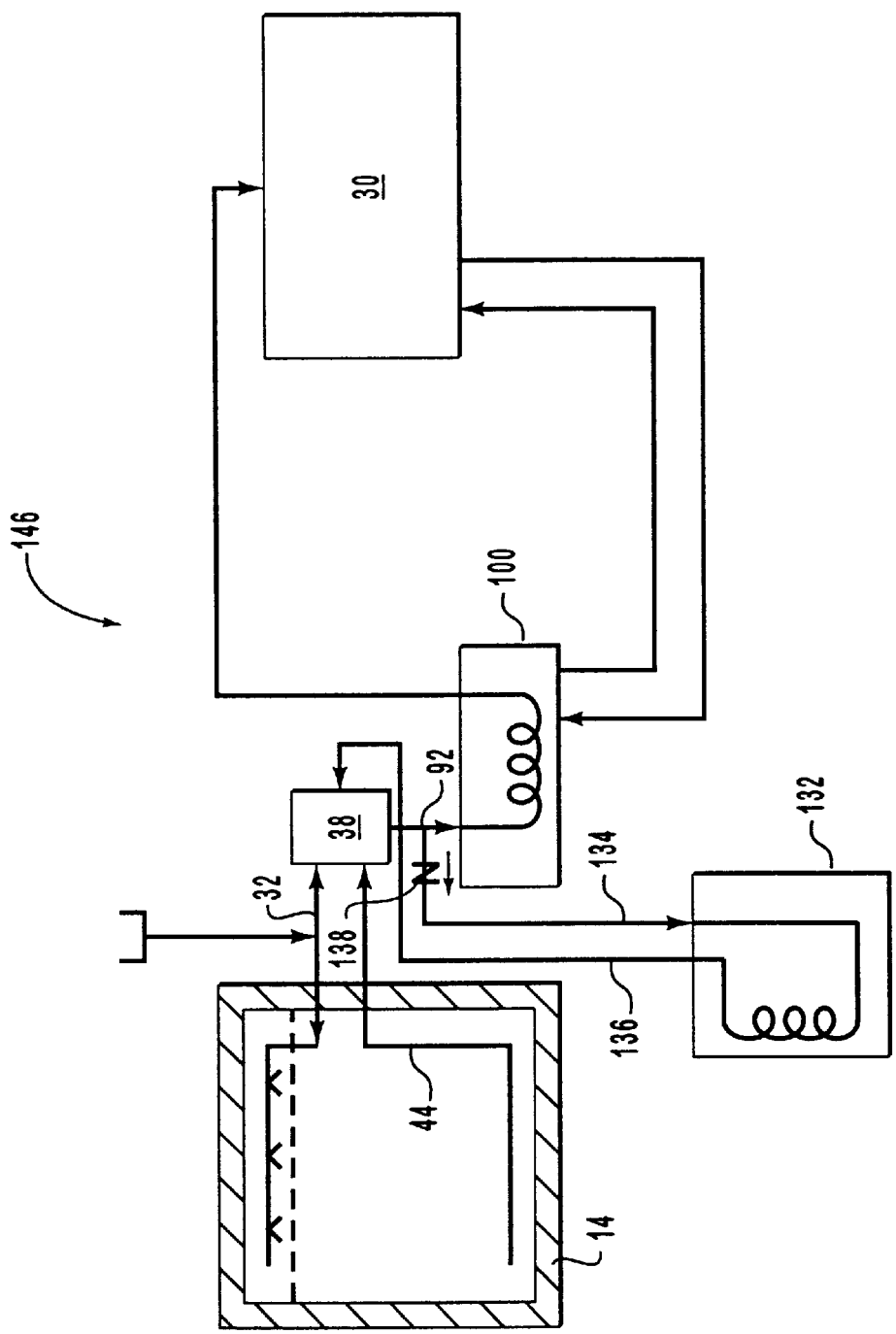

Depicted in FIG. 9 is a fluid delivery system 146 also comparable to fluid delivery system 130. In fluid delivery system 146, however, conduit 136 is fluid coupled to economizer valve 38 in substantially the same way that conduit 22 is coupled to economizer valve 38 as previously discussed with regard to FIGS. 4 and 5.

Figure 10:
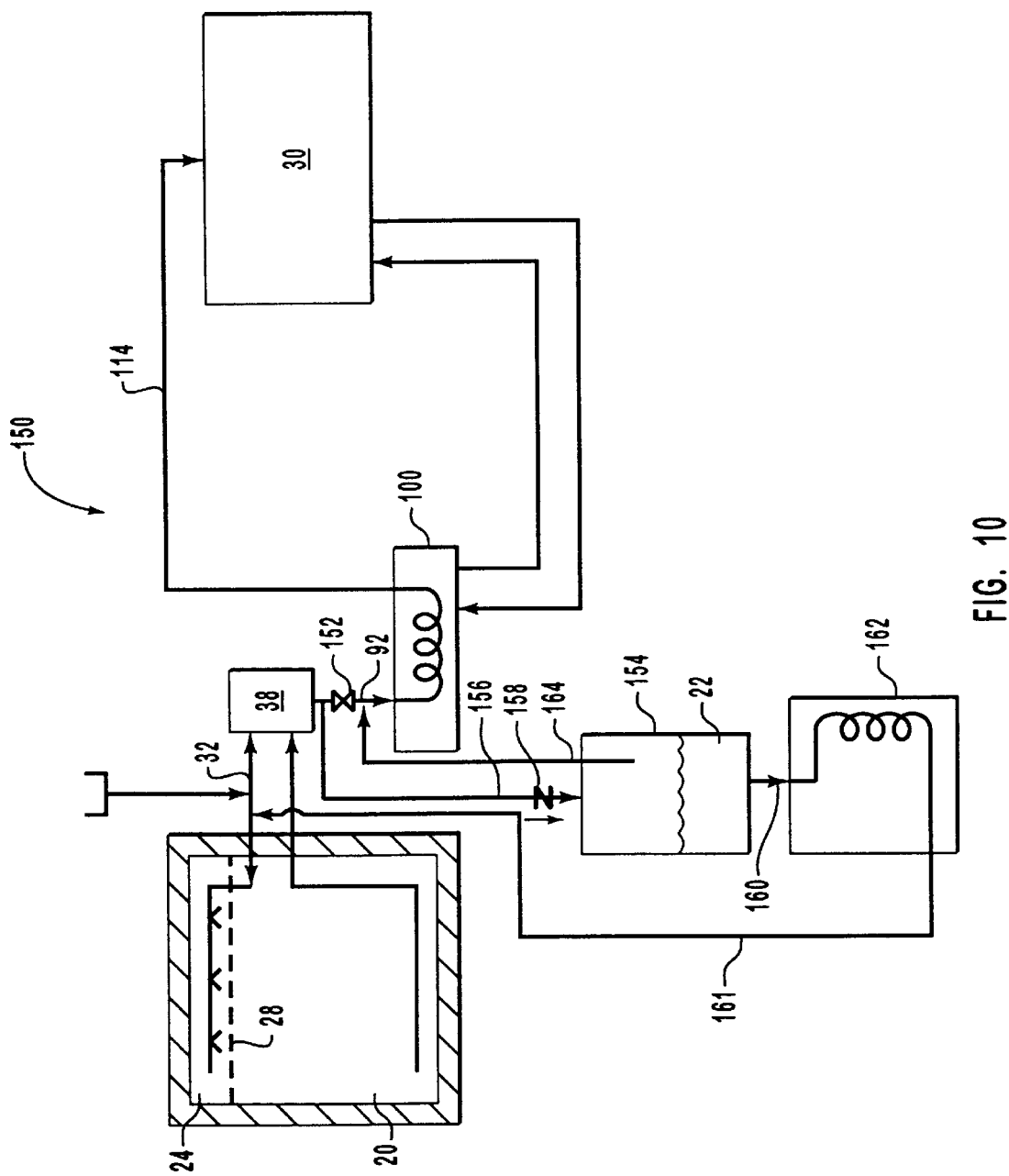

Depicted in FIG. 10 is yet another alternative embodiment of a fluid delivery system 150. In this embodiment, when vaporizer 38 is positioned too high relative to level 28 of liquified natural gas 22 to drive fuel into engine 30, solenoid 152 on transition conduit 92 closes causing the natural gas to flow from transition conduit 92 to a small reservoir 154 through a conduit 156. A one way check valve 158 prevents a back flow of vaporized gas. In turn, a conduit 160 feeds liquified natural gas 22 from reservoir 154 to a secondary vaporizer 162 positioned at a desired elevation relative to tank 14. Vaporizer 162 is also coupled to vapor conduit 32 by a conduit 161 for pressurizing vapor holding portion 24 as previously discussed with regard to FIG. 2. A conduit 164 allows vaporized natural gas to travel from reservoir 154 back to vaporizer 38. Once sufficient pressure is built within the system, solenoid 152 can be opened to allow direct flow into vaporizer 38.

Figure 11:
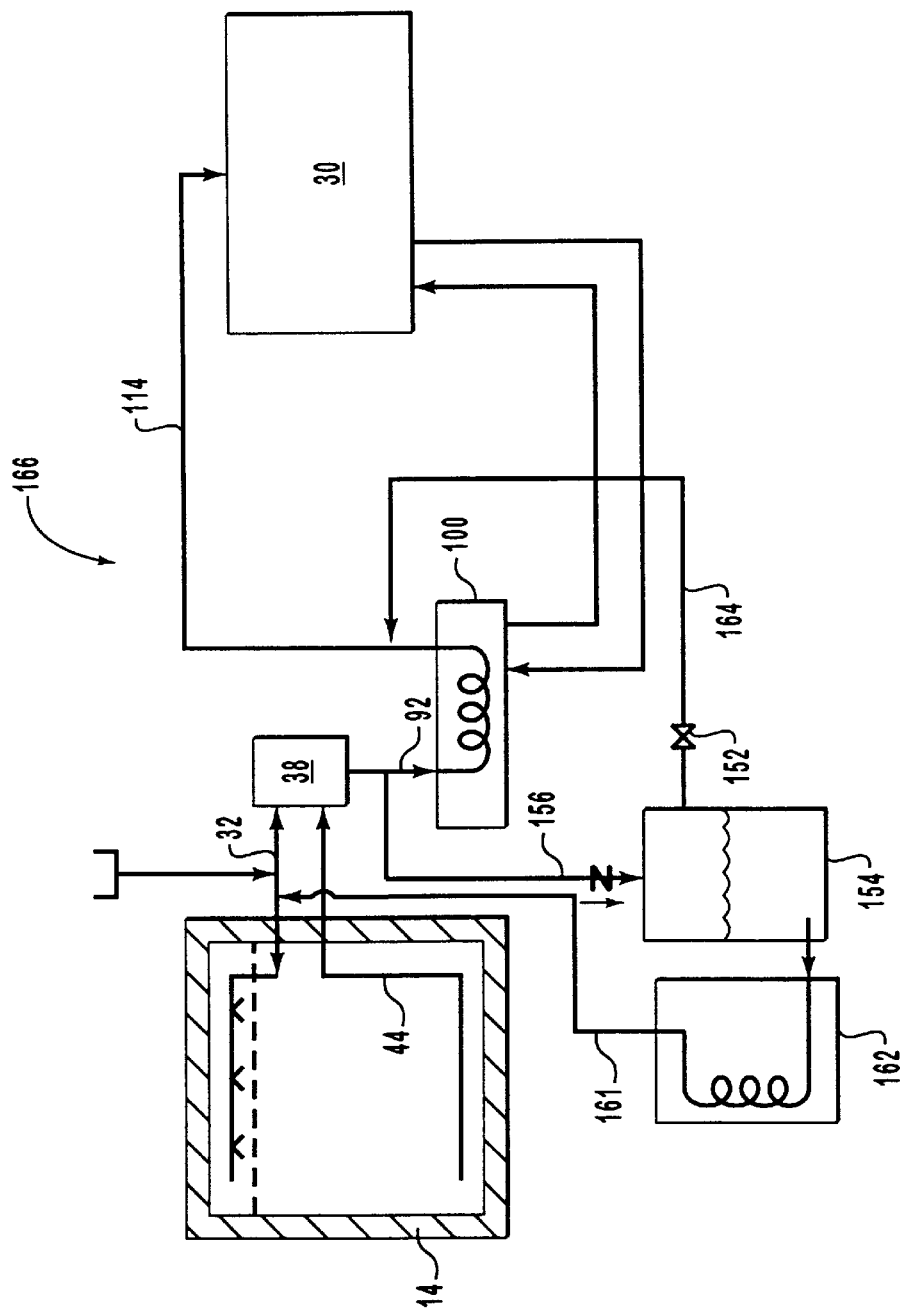

Depicted in FIG. 11 is a fluid delivery system 166 similar to fluid delivery system 150 depicted in FIG. 10. In contrast, however, conduit 164 now extends from reservoir 154 to delivery conduit 114. Solenoid valve 152 has also been moved from transition conduit 92 to conduit 164. When solenoid valve 152 is open, liquid natural gas passes from transition conduit 92 into reservoir 154 through conduit 156. When solenoid 152 is closed, liquid natural gas within reservoir 154 travels through vaporizer 162 and back into conduit 32 for pressurizing the system.

Figure 12:
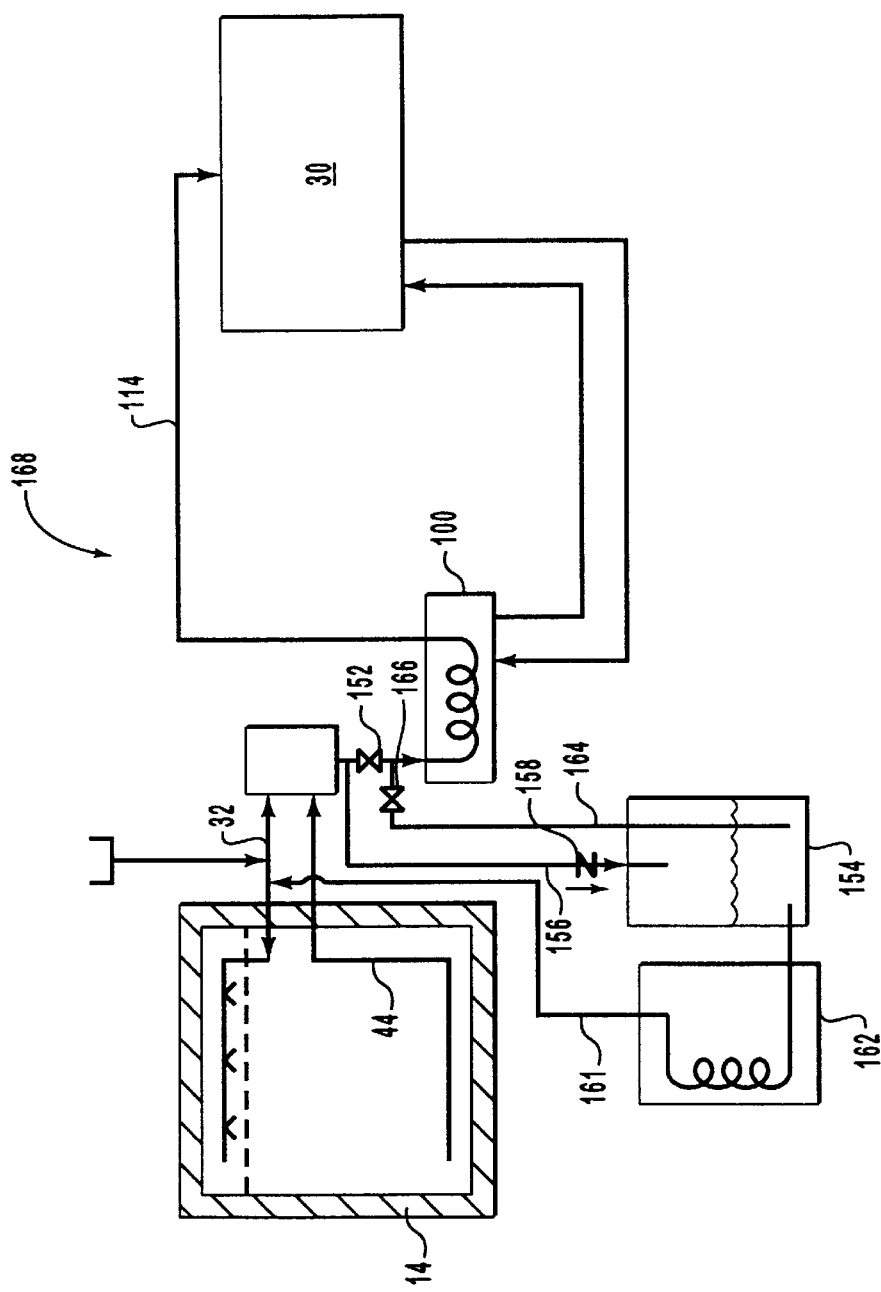

Depicted in FIG. 12 is a fluid delivery system 168 substantially the same as that depicted in FIG. 10 except that an additional solenoid 166 has been positioned on conduit 164. When solenoid 166 is closed, liquid natural gas in reservoir 154 is vaporized in vaporizer 162 and returned to vapor conduit 32 for pressurizing the system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A fuel system for delivering natural gas to an engine, the system comprising:
   (a) a fuel tank configured to receive the natural gas at cryogenic temperatures, the fuel tank having a liquid holding portion and a vapor holding portion;
   (b) a vaporizer disposed an elevational distance below the fuel tank, the vaporizer having an inlet end and an outlet end;
   (c) a first conduit extending from the liquid holding portion of the fuel tank to the inlet end of the vaporizer;
   (d) a second conduit extending from the outlet end of the vaporizer to the fuel tank;
   (e) means for delivering the natural gas from the vaporizer to the engine;
   (f) an economizer valve, fluid coupled with the first conduit; and
   (g) a conduit extending from the vapor holding portion of the tank to the economizer valve.

2. A fuel system as recited in claim 1, wherein the means for delivering comprises a conduit extending from the second conduit to the engine.

3. A fuel system for delivering natural gas to an engine, the system comprising:
   (a) an insulated fuel tank configured to receive the natural gas in a liquid state, the fuel tank having a liquid holding portion and a vapor holding portion;
   (b) an economizer valve with a vapor conduit that extends from the vapor holding portion of the insulated fuel tank, and a liquid conduit that has a first end positioned within the liquid holding portion of the insulated fuel tank and an opposing second end that is fluid coupled to the economizer valve;
   (c) means for delivering the natural gas from the fuel tank to the engine; and
   (d) a vaporizer, fluid coupled with the fuel tank in a continuous loop, the vaporizer being configured to receive liquid natural gas from the liquid holding portion of the fuel tank, vaporize the liquid natural gas, and return vaporized natural gas to the vapor holding portion of the fuel tank, the vaporizer being positioned at an elevation relative to the fuel tank such that the height of the liquid natural gas extending between the surface of the liquid natural gas when disposed within the fuel tank and the vaporizer produces a pressure on the vaporized natural gas greater than the sum of pressure losses to which the natural gas is subject as the natural gas passes from the fuel tank, through the vaporizer, and back to the fuel tank.

4. A fuel system as recited in claim 3, wherein the fuel tank is mounted to a vehicle.

5. A fuel system for delivering natural gas to an engine, the system comprising:
(a) an insulated fuel tank configured to receive the natural gas in a liquid state, the fuel tank having a liquid holding portion and a vapor holding portion;
(b) means for passively delivering the natural gas from the fuel tank to the engine while automatically and passively maintaining a pressure within a predetermined range within the vapor holding portion of the fuel tank, wherein the means for passively delivering comprises:
(c) an economizer valve;
(d) a vapor conduit extending from the vapor holding portion of the fuel tank to the economizer valve; and
(e) a liquid conduit extending from the liquid holding portion of the fuel tank to the economizer valve.

6. A fuel system for delivering natural gas to an engine, the system comprising:
(a) a fuel tank configured to retain liquified natural gas and vaporized natural gas;
(b) control means for automatically withdrawing a select gas chosen from either the liquified natural gas or the vaporized natural gas from the fuel tank based on the pressure within the fuel tank;
(c) a vaporizer, fluid coupled to the control means so as to receive the select gas, the vaporizer being positioned below the level of the liquified natural gas within the fuel tank;
(d) means for delivering at least a portion of the select gas from the vaporizer to the engine; and
(e) means for enabling delivery of a portion of the select gas from the vaporizer back to the fuel tank.

7. A fuel system as recited in claim 6, wherein the control means comprises an economizer valve fluid coupled to the liquified natural gas within the fuel tank and the vaporized natural gas within the fuel tank.

8. A fuel system as recited in claim 6, wherein the means for delivering at least a portion of the select gas from the vaporizer to the engine comprises a delivery conduit extending from the vaporizer to the engine.

9. A fuel system as recited in claim 7, wherein the means for enabling delivery of a portion of the select gas from the vaporizer back to the fuel tank comprises a return conduit extending from the vaporizer to the economizer.

10. A fuel system for delivering natural gas to an engine, the system comprising:
(a) an insulated fuel tank configured to receive the natural gas in a liquid form, the fuel tank having a liquid holding portion and a vapor holding portion;
(b) an economizer valve;
(c) a conduit extending from the vapor holding portion of the fuel tank to the economizer valve;
(d) a conduit extending from the liquid holding portion of the fuel tank to the economizer valve;
(e) a vaporizer, fluid coupled to the economizer valve;
(f) a delivery conduit extending from the vaporizer to the engine; and
(g) means for maintaining a pressure within the vapor holding portion of the fuel tank.

11. A fuel delivery system as recited in claim 10, wherein the vaporizer is positioned below the level of the liquified natural gas within the fuel tank.

12. A fuel delivery system as recited in claim 10, wherein the means for maintaining a pressure comprises a return conduit extending from the delivery conduit to the fuel tank.

13. A fuel delivery system as recited in claim 10, wherein the means for maintaining a pressure comprises a secondary vaporizer configured to receive liquified natural gas from the fuel tank and return vaporized natural gas to the fuel tank.

14. A fuel delivery system as recited in claim 10, wherein the fuel tank is mounted to a vehicle.

15. A fuel delivery system as recited in claim 10, further comprising a flow restricter coupled with the delivery conduit.

16. A fuel system for delivering natural gas to an engine, the system comprising:
(a) a fuel tank configured to receive the natural gas at cryogenic temperatures, the fuel tank having a liquid holding portion and a vapor holding portion;
(b) a vaporizer disposed an elevational distance below the fuel tank, the vaporizer having an inlet end and an outlet end;
(c) a first conduit extending from the liquid holding portion of the fuel tank to the inlet end of the vaporizer;
(d) a second conduit extending from the outlet end of the vaporizer to the fuel tank; and
(e) means for delivering the natural gas from the vaporizer to the engine, wherein the vaporizer is disposed at an elevational distance greater than 6 inches below the fuel tank.

17. A fuel system as recited in claim 16, wherein the means for delivering comprises a conduit extending from the second conduit to the engine.

18. A fuel system for delivering natural gas to an engine, the system comprising:
(a) an insulated fuel tank configured to receive the natural gas in a liquid state, the fuel tank having a liquid holding portion and a vapor holding portion;
(b) means for passively delivering the natural gas from the fuel tank to the engine while automatically and passively maintaining a pressure within a predetermined range within the vapor holding portion of the fuel tank, wherein the means for passively delivering further comprises:
(c) a vaporizer;
(d) a transition conduit extending from the economizer valve to the vaporizer;
(e) a delivery conduit extending from the vaporizer to the engine;
(f) a return conduit extending from the delivery conduit to the vapor holding portion of the fuel tank.

19. A fuel system as recited in claim 18, wherein the wherein the vaporizer is positioned at an elevational distance below the fuel tank.

* * * * *